United States Patent
Cook

(10) Patent No.: US 8,096,559 B2
(45) Date of Patent: Jan. 17, 2012

(54) ROTARY SEALS

(75) Inventor: Hugh Q. Cook, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 414 days.

(21) Appl. No.: 12/465,185

(22) Filed: May 13, 2009

(65) Prior Publication Data

US 2009/0289418 A1    Nov. 26, 2009

Related U.S. Application Data

(60) Provisional application No. 61/055,907, filed on May 23, 2008.

(51) Int. Cl.
*F16J 15/34* (2006.01)
*F16J 15/32* (2006.01)

(52) U.S. Cl. .......................... 277/353; 277/551
(58) Field of Classification Search .............. 277/353, 277/551, 561, 564, 569
See application file for complete search history.

(56) References Cited

U.S. PATENT DOCUMENTS

| | | | | |
|---|---|---|---|---|
| 2,804,325 | A * | 8/1957 | Riesing | 277/559 |
| 3,511,512 | A * | 5/1970 | Wheelock | 277/564 |
| 3,905,608 | A | 9/1975 | Olsen et al. | |
| 3,973,781 | A * | 8/1976 | Grorich | 277/559 |
| 4,623,153 | A * | 11/1986 | Nagasawa | 277/551 |
| 4,655,945 | A | 4/1987 | Balsells | |
| 4,804,290 | A | 2/1989 | Balsells | |
| 4,805,943 | A | 2/1989 | Balsells | |
| 4,830,344 | A | 5/1989 | Balsells | |
| 5,134,244 | A | 7/1992 | Balsells | |
| 5,161,806 | A | 11/1992 | Balsells | |
| 5,265,890 | A | 11/1993 | Balsells | |
| 5,385,351 | A * | 1/1995 | White | 277/572 |
| 5,575,487 | A | 11/1996 | Balsells | |
| 5,979,904 | A | 11/1999 | Balsells | |
| 5,984,316 | A | 11/1999 | Balsells | |
| 5,992,856 | A | 11/1999 | Balsells et al. | |
| 6,050,572 | A | 4/2000 | Balsells et al. | |
| 6,161,838 | A | 12/2000 | Balsells | |
| 6,264,205 | B1 * | 7/2001 | Balsells | 277/551 |

(Continued)

FOREIGN PATENT DOCUMENTS

JP    01-077169 U    5/1989

(Continued)

OTHER PUBLICATIONS

International Preliminary Report on Patentability mailed Dec. 2, 2010 from corresponding International Application No. PCT/US2009/043921, filed May 14, 2009 (10 pages).

(Continued)

*Primary Examiner* — Thomas Beach
*Assistant Examiner* — Nicholas L Foster
(74) *Attorney, Agent, or Firm* — Klein, O'Neill & Singh, LLP

(57) ABSTRACT

Seal assemblies are herein discussed. The seal assemblies can have a stiff backing ring supporting a seal ring, which is positioned adjacent an inner seal ring. In preferred embodiments, the inner seal ring is made from a material that enables the inner seal ring to absorb media particles in situ to change its particle density. This allows the seal assembly to form wearable surfaces on the fly to decrease wear on the seal ring.

25 Claims, 1 Drawing Sheet

U.S. PATENT DOCUMENTS

| | | | |
|---|---|---|---|
| 6,367,811 B1 * | 4/2002 | Hosokawa et al. ........... 277/560 |
| 6,565,096 B2 * | 5/2003 | Ikeda et al. .................... 277/551 |
| 6,641,141 B2 | 11/2003 | Schroeder |
| 6,840,521 B2 * | 1/2005 | Ikeda ............................ 277/551 |
| 7,210,398 B2 | 5/2007 | Balsells |
| 7,344,140 B2 * | 3/2008 | Ikeda ............................ 277/572 |
| 7,942,424 B2 * | 5/2011 | Shimomura et al. .......... 277/551 |
| 8,011,672 B2 * | 9/2011 | Shimomura et al. .......... 277/551 |
| 2002/0014747 A1 * | 2/2002 | Yamada et al. ................ 277/619 |
| 2002/0089124 A1 * | 7/2002 | Hosokawa et al. ............ 277/551 |
| 2002/0153664 A1 * | 10/2002 | Schroeder ..................... 277/551 |

FOREIGN PATENT DOCUMENTS

JP  2004-251413 A  9/2004

OTHER PUBLICATIONS

International Search Report completed and mailed Jan. 20, 2010 from corresponding International Application No. PCT/US2009/043921, filed May 14, 2009 (3 pages).

Written Opinion completed and mailed Jan. 20, 2010 from corresponding International Application No. PCT/US2009/043921, filed May 14, 2009 (6 pages).

* cited by examiner

ROTARY SEALS

CROSS-REFERENCE TO RELATED APPLICATION

This is an ordinary utility application of provisional Ser. No. 61/055,907, filed May 23, 2008, the contents of which are expressly incorporated herein by reference as if set forth in full.

BACKGROUND

Seal assemblies are generally discussed herein for sealing a first environment or chamber from a second environment or chamber with particular discussions extended to rotary shaft seals in which a seal is retained within a housing on a shaft and a constant pressure is exerted by the seal on the shaft to maintain a dynamic seal between the shaft and the seal. More particularly, rotary seals for use in abrasive environments, such as mud pumps, sludge pumps, and recovery pumps, to name a few, are discussed.

Seal assemblies for rotating, reciprocating, and face seal applications are well known in the art and are taught by, for example, U.S. Pat. Nos. 4,805,943; 4,830,344; 5,134,244; 5,265,890; 5,979,904; 5,984,316; 5,992,856; 6,050,572; 6,161,838; 6,264,205; and 6,641,141, the contents of each of which are expressly incorporated herein by reference.

Prior art polytetrafluoroethylene (PTFE) based seals, either as pure PTFE or PTFE composites, are preferred by some because they provide flexibility, low-friction, and self-lubrication when used in sealing arrangements with a moving shaft, such as a rotating or reciprocating shaft. However, PTFE material used in making seals can wear faster than desired when used in abrasive environments. Thus, operating life of PTFE-based seals is shorter than preferred when placed in these applications and conditions.

SUMMARY

Aspects of the present invention comprises a seal assembly comprising a rigid backing ring made of a first material having an axially extending flange; a seal ring made of a second material positioned next to the backing ring and in mechanical engagement with the backing ring and having a sealing lip; an inner seal ring made of a third material in mechanical contact with the seal ring; a retaining ring positioned away from the backing ring for fitting against a housing; and an energizer for biasing the sealing lip in a radial direction, and wherein the inner seal ring is configured to receive a plurality of particles.

In a particular application of the seal assembly, the particles are abrasive particles present in a fluid medium.

In an embodiment, the seal ring comprises a PTFE material. In other embodiments, the seal ring is made from a PTFE filled type seal material or from ultra high molecular weight polyethylene (UHMWPE).

In an embodiment, the inner seal ring is made from a resilient elastomer. The inner seal ring of the seal assembly may be considered a sacrificial layer in that it is configured to wear before the seal ring wears to a point that the seal ring no longer forms a seal against a shaft.

In an embodiment, the backing ring is made from a PEEK material, ferrous metal, or a non-ferrous metal. In other embodiments, the backing ring is made from an engineered polymer material, such as, for example, ULTEM, PEKK, PAEK, PEI, or other high performance engineering polymers.

In a preferred embodiment, the energizer is a canted-coil spring.

In a further aspect of the present invention, a combination seal assembly and shaft is provided. The combination comprising a seal ring comprising a receiving area and a seal lip in contact with the shaft; an inner seal ring comprising a receiving area received in the receiving area of the seal ring; an energizer positioned in the receiving area of the inner seal ring; a backing ring in contact with the seal ring; and wherein the inner seal is a sacrificial layer having a first state and a second state, said second state characterized by a surface having a plurality of particles not present when in the first state.

The present invention is also directed to a method for forming a sacrificial layer in-situ comprising: providing a seal assembly having a sacrificial layer adjacent a seal layer; the sacrificial layer comprising an elastomer layer having a surface having a first concentration of particles; mounting the seal assembly onto a shaft and placing the shaft in dynamic motion; and wherein the sacrificial layer is configured to receive particles when the shaft is in dynamic motion so that the elastomer layer comprises a second concentration of particles, which is greater than the first concentration.

DETAILED DESCRIPTION

Figure 1:
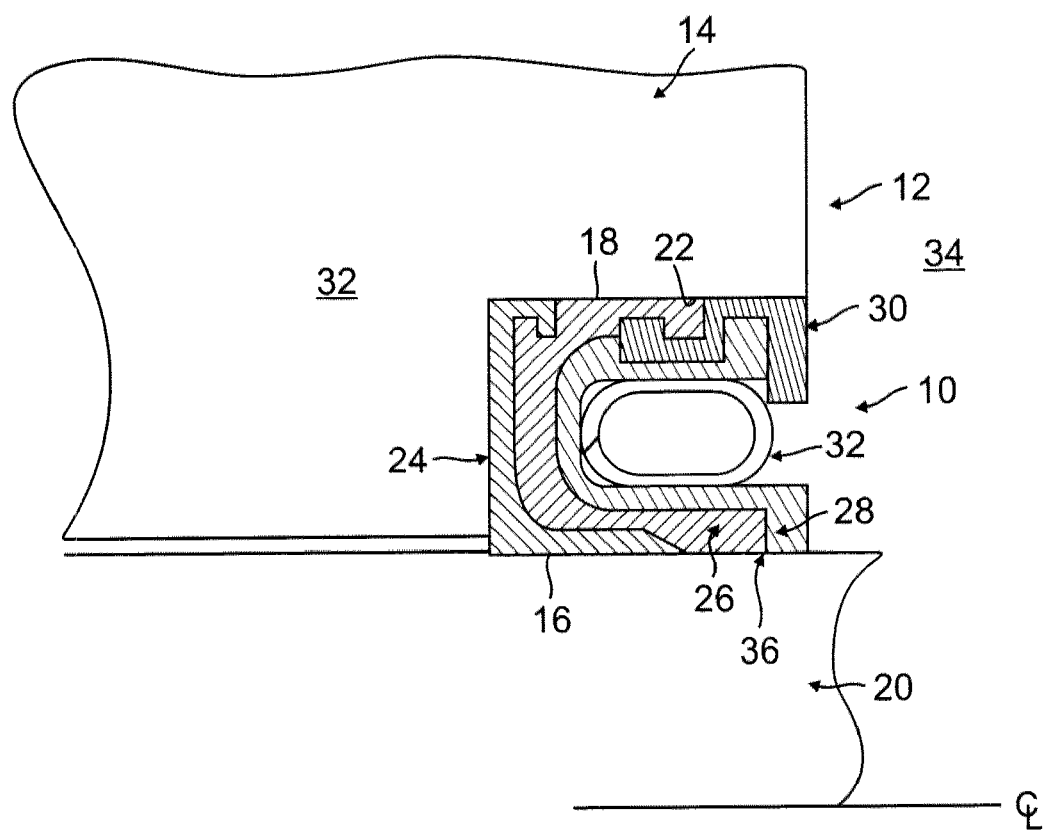
FIG. 1 is a cross-sectional side view of a seal assembly mounted on a moveable shaft inside a seal cavity.

The detailed description set forth below in connection with the appended drawings is intended as a description of the presently preferred embodiments of seal assemblies provided in accordance with aspects of the present invention and is not intended to represent the only forms in which the present invention may be constructed or utilized. The description sets forth the features and the steps for constructing and using the seal assemblies of the present invention in connection with the illustrated embodiments. It is to be understood, however, that the same or equivalent functions and structures may be accomplished by different embodiments that are also intended to be encompassed within the spirit and scope of the invention.

With reference now to FIG. 1, there is shown a cross-sectional side view of a seal assembly 10 mounted in a gland, stuffing box or seal cavity 12 of a rotating, oscillating, or static equipment, such as a pump, compressor, turbine, gear box, or engine. The seal assembly 10 is mounted to a gland or equipment housing 14 and is preferably stationary relative to the housing 14. The seal assembly is generally circular in nature and comprises an inside diameter 16 in dynamic sealing communication with a shaft 20 and an outside diameter 18 in static communication with an internal bore 22 of the housing 14. Known interference requirements between the seal and the shaft and the seal and the housing may be used to implement the preferred seal assembly.

In the embodiment shown, the seal assembly 10 incorporates an externally facing backing ring 24, a seal ring or seal layer 26, an inner seal layer 28, a retaining or locking ring 30, and an energizer 32, which is preferably a canted-coil spring or O-ring (not shown) of suitable resilient characteristics for exerting the necessary force on the seal ring 26 and inner seal layer 28 to seal against the shaft 20. Exemplary O-rings or energizers are disclosed in U.S. Pat. Nos. 4,893,795; 4,974,821; 5,108,078; 5,139,276; and 7,175,441, the contents of each of which are expressly incorporated herein by reference.

The seal assembly shares certain features of a K-Series rotary seals from Bal Seal Engineering of Foothill Ranch, Calif.

The backing ring 24 is configured to be mounted facing the low pressure region 32, such as ambient atmosphere, while the inner seal layer 28 and the seal ring 26 are configured to seal the rotating equipment or device from leakage from the high pressure region 34. In an embodiment, the inner seal layer 28 is a sacrificial layer formed from an elastomeric material and has a cavity for accommodating the energizer 32. The sacrificial layer 28 is preferably resilient and in one embodiment is made from a HYTREL® elastomer, which is a thermoplastic polyester elastomer, of about a 60 D to 80 D durometer hardness. In certain embodiments, the sacrificial layer 28 is micro-balloon filled with a plurality of pockets or voids. The pockets or voids can facilitate in-situ sacrificial layer formation, as further discussed below. In other embodiments, the sacrificial layer is formed from a higher, relatively firmer, durometer, such as greater than 80 D durometer hardness. In a preferred embodiment, the sacrificial layer is made from a softer material, i.e., more pliable, than the seal ring 26. In other embodiments, the sacrificial seal layer or ring 28 is made from a resilient elastomer, such as nitrile butadiene and urethane. In still other embodiments, the sacrificial seal layer is made from a number of commercially available thermo plastic elastomer material (TPE).

The sacrificial layer 28 is placed in adjacent contact with the seal ring 26, which in one embodiment is made of a PTFE, PTFE filled type material, or UHMWPE material. Optionally, the two layers 26, 28 can be mechanically locked to one another, such as using detents or tongue and groove arrangement, or chemically secured together, such as by glue or adhesive. Similarly, the backing ring 24 and the locking ring 30 are held to the two seal layers through one or more detent arrangements. In one embodiment, the backing ring 24 is made from a PEEK material and the locking ring 30 is made from a metallic material, such as stainless or other metal composites appropriate for the particular application. In other embodiments, the backing ring 24 is made from a ferrous metal or a non-ferrous metal. In other embodiments, the backing ring is made from an engineered polymer material, such as, for example, ULTEM, PEKK. PAEK, PEI, or other high performance engineering polymers.

When the seal assembly 10 is used in an abrasive environment, abrasive particles such as sand, hydrocarbon-based particles, for example, coke fines or slurries, can be drawn to the dynamic sealing interface 36 where the two seal layers 26, 28 contact the shaft 20. Abrasive particles trapped in the small gap or interface between the shaft and the seal layers normally can wear the seal layer 26 and the sacrificial layer 28 and eventually create a path for fluid or medium leakage from between the high pressure region 34 to the low pressure region 32. In the present embodiment, the sacrificial layer 28 is configured to absorb particles, slurries, coke fines, and the like, herein media particles. Said differently, the media particles are configured to embed into the sacrificial layer 28 so that a new modified sacrificial layer is formed in-situ that comprises a particle-filled sacrificial layer having a higher concentration of particles than prior being placed in service. Thus, as the concentration of particles in the sacrificial layer increases over time, the wear rate on either the sacrificial layer or the seal layer or both diminishes due to the newly created sacrificial layer, which has the effect of causing like particles to wear against themselves. The net effect is a reduction in sacrificial surface wear, which in turn protects the sealing layer 26 from the abrasive environment and therefore does not wear at the same rate as compared to when no in-situ sacrificial layer is incorporated.

Thus, in accordance with aspects of the present invention, there is provided a seal assembly comprising a multi-layer seal surface in which at least one of the surfaces changes from a first state to a second state having a density of embedded particles. Preferably, the second state has a higher concentration of particles or density than the first state. Aspects of the present invention further comprises a seal assembly in which an inner seal is made to last longer, such as having a reduced wear pattern in an abrasive environment, by incorporating a sacrificial layer. In an embodiment, the sacrificial layer is made from a pliable elastomer material adapted to change from a first state to a second state, said second state characterized by the presence of particles not present in the first state.

In a further aspect of the present invention, there is provided a method for reducing wear rate of a seal surface of a seal assembly, said method comprising forming a sacrificial layer in-situ with a plurality of particles not originally present in the seal assembly. In a specific embodiment, the particles are accumulated from the fluid medium in which the seal assembly operates.

In a yet further aspect of the present invention, there is provided a method for allowing and encouraging the embedding of abrasive particles in a soft elastomer lamination layer so that the lamination layer comprises the same abrasive particles as the abrasive particles in the fluid medium in which the seal assembly operates.

In certain applications, a shaft sleeve (not shown) is incorporated over the shaft 20 so that the seal assembly can seal against the sleeve. The shaft sleeve may be hardened using known methods, such as by quenching, diamond coated, etc.

Although limited embodiments of seal assemblies and their components have been specifically described and illustrated herein, many modifications and variations will be apparent to those skilled in the art. For example, a different combination of inner seal layer and backing ring may be used instead of PTFE and PEEK. As another example, two or more sacrificial layers may be incorporated in a seal assembly. For example, the inner most sacrificial layer may have a softest material and the second inner most sacrificial layer may have an increasingly stiffer material. Accordingly, it is to be understood that the seal assemblies and their components constructed according to principles of this invention may be embodied other than as specifically described herein. The invention is also defined in the following claims.

What is claimed is:

1. A seal assembly comprising a rigid backing ring made of a first material having an axially extending flange; a seal ring made of a second material positioned next to the backing ring and in mechanical engagement with the backing ring and having a sealing lip; an inner seal ring made of a third material in mechanical contact with the seal ring; a retaining ring positioned away from the backing ring for fitting against a housing, and located, at least in part, between the seal ring and the inner seal ring; and an energizer overlapping the seal ring, the inner seal ring, and the backing ring, at least in part, along a radial direction for biasing the sealing lip in a radial direction; and wherein the inner seal ring is made from a material configured to receive media particles in situ.

2. The seal assembly of claim 1, wherein the media particles are abrasive particles present in a fluid medium.

3. The seal assembly of claim 2, wherein the seal ring comprises a PTFE material.

4. The seal assembly of claim 3, wherein the inner seal ring is a sacrificial layer.

5. The seal assembly of claim 3, wherein the backing ring comprises at least one of a PEEK material, a ferrous metal, a non-ferrous metal, polyetherketoneketone (PEKK), poly aryl ether ketone (PAEK), and polyether imide (PEI).

6. The seal assembly of claim 1, wherein the energizer is a canted-coil spring.

7. The seal assembly of claim 1, wherein the inner seal ring is made from at least one of a thermoplastic polyester elastomer, a resilient elastomer, and a thermoplastic elastomer material.

8. The seal assembly of claim 1, wherein the inner seal ring comprises a plurality of pockets or voids for receiving media particles in situ.

9. The seal assembly of claim 8, wherein the energizer biases the inner seal ring radially along a first direction and radially along a second direction, which is opposite the first direction.

10. A combination seal assembly and shaft comprising: a seal ring comprising a receiving area and a seal lip in contact with the shaft; an inner seal ring received in the receiving area of the seal ring; a rigid backing ring in contact with the seal ring; a retaining ring positioned away from the backing ring for fitting against a housing, and located, at least in part, between the seal ring and the inner seal ring; an energizer overlapping the seal ring, the inner seal ring, and the backing ring, at least in part, along a radial direction and biased against the inner seal ring; and wherein the inner seal is a sacrificial layer having a first state and a second state, said second state characterized by a surface having a plurality of particles not present when in the first state.

11. The combination seal assembly and shaft of claim 10, further comprising a locking ring mechanically coupled to the inner seal ring.

12. The combination seal assembly and shaft of claim 10, wherein the inner seal ring comprises a channel, and wherein the energizer is located within the channel of the inner seal ring.

13. The combination seal assembly and shaft of claim 10, wherein the energizer is a canted coil spring.

14. The combination seal assembly and shaft of claim 10, wherein the shaft is a pump shaft or a shaft sleeve.

15. The combination seal assembly and shaft of claim 10, wherein the seal ring comprises a PTFE material.

16. The combination seal assembly and shaft of claim 10, wherein the inner seal ring touches the shaft.

17. The combination seal assembly and shaft of claim 10, wherein the backing ring comprises at least one of a PEEK material, a ferrous metal, a non-ferrous metal, polyetherketoneketone (PEKK), poly aryl ether ketone (PAEK), and polyether imide (PEI).

18. The combination seal assembly and shaft of claim 10, wherein the inner seal ring is made from at least one of a thermoplastic polyester elastomer, a resilient elastomer, and a thermoplastic elastomer material.

19. The combination seal assembly and shaft of claim 10, wherein the inner seal ring comprises a plurality of pockets or voids for receiving the plurality of particles.

20. The combination seal assembly and shaft of claim 19, wherein the energizer biases the inner seal ring in a first direction towards the shaft and a second direction away from the shaft.

21. A method for forming a sacrificial layer in-situ comprising:
providing a seal assembly comprising a rigid backing ring made of a first material having an axially extending flange; a seal ring made of a second material positioned next to the backing ring and in mechanical engagement with the backing ring and having a sealing lip; an inner seal ring made of a third material in mechanical contact with the seal ring; a retaining ring positioned away from the backing ring for fitting against a housing, and located, at least in part, between the seal ring and the inner seal ring; and an energizer overlapping the seal ring, the inner seal ring, and the backing ring, at least in part, along a radial direction for biasing the sealing lip in a radial direction; and wherein the inner seal ring is a sacrificial layer and is made from a material configured to receive media particles in situ; and the sacrificial layer comprises an elastomer layer having a surface having a first concentration of media particles;
mounting the seal assembly onto a shaft and placing the shaft in dynamic motion; and
wherein the sacrificial layer is configured to receive media particles when the shaft is in dynamic motion so that the elastomer layer comprises a second concentration of media particles, which is greater than the first concentration of particles.

22. The method of claim 21, wherein the rigid backing ring is made of a first material; the seal ring is made of a second material; and the inner seal ring is made of a third material.

23. The method of claim 21, wherein the energizer biases the sealing lip against the shaft.

24. The method of claim 23, wherein the energizer is a canted coil spring.

25. The method of claim 22, wherein the inner seal ring is filled with a plurality of pockets or voids.

\* \* \* \* \*